(12) United States Patent
Zhao et al.

(10) Patent No.: US 12,056,393 B2
(45) Date of Patent: Aug. 6, 2024

(54) SYSTEM AND METHOD FOR EXCHANGING MESSAGES

(71) Applicant: REALTEK SEMICONDUCTOR CORPORATION, Hsinchu (TW)

(72) Inventors: Shi-Yao Zhao, Suzhou (CN); Dao-Fu Wang, Suzhou (CN); Yong-Peng Jing, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 1 day.

(21) Appl. No.: 17/381,230

(22) Filed: Jul. 21, 2021

(65) Prior Publication Data
US 2022/0156006 A1  May 19, 2022

(30) Foreign Application Priority Data
Nov. 13, 2020  (CN) .......................... 202011273194.4

(51) Int. Cl.
*G06F 3/06*  (2006.01)
*G06F 13/16*  (2006.01)

(52) U.S. Cl.
CPC .......... *G06F 3/0659* (2013.01); *G06F 3/0607* (2013.01); *G06F 3/0679* (2013.01); *G06F 13/1668* (2013.01)

(58) Field of Classification Search
CPC .... G06F 3/0659; G06F 3/0607; G06F 3/0679; G06F 13/1668; G06F 3/0604; G06F 3/0656; G06F 12/0238; G06F 12/0246
See application file for complete search history.

(56) References Cited

U.S. PATENT DOCUMENTS

| | | | |
|---|---|---|---|
| 10,459,634 B2* | 10/2019 | Benisty | G06F 3/0688 |
| 2012/0124572 A1* | 5/2012 | Cunningham | G06F 9/545 |
| | | | 718/1 |
| 2015/0127882 A1* | 5/2015 | Carlson | G06F 13/10 |
| | | | 711/103 |
| 2018/0113615 A1* | 4/2018 | Park | G06F 3/061 |
| 2019/0377516 A1* | 12/2019 | Rao | G06F 3/0683 |

(Continued)

OTHER PUBLICATIONS

NVM Express Base Specification Revision 1.4, Jun. 2019 (Year: 2019).*

(Continued)

*Primary Examiner* — Paul M Knight
(74) *Attorney, Agent, or Firm* — WPAT, PC

(57) ABSTRACT

A method for exchanging messages is performed by a slave device, and includes: receiving a submission queue (SQ) tail doorbell from a host to learn that X SQ entries need to be processed, wherein "X" doesn't exceed a host SQ entry upper limit; performing multiple read operations according to the SQ tail doorbell to read the X SQ entries from the host, wherein the slave device reads Y SQ entries at most in each read operation, and "Y" is smaller than "X" and doesn't exceed a slave device SQ entry upper limit; preparing P completion queue (CQ) entries; performing multiple write operations to transmit the P CQ entries to the host, wherein the slave device transmits Q CQ entries at most in each write operation, and "Q" is smaller than "P" and doesn't exceed a slave device CQ entry upper limit; and transmitting a CQ tail doorbell to the host.

2 Claims, 9 Drawing Sheets

(56) References Cited

U.S. PATENT DOCUMENTS

2021/0049114 A1\* 2/2021 Kim .................. G06F 13/28
2022/0050629 A1\* 2/2022 Vlasov ................ G06F 3/0656

OTHER PUBLICATIONS

Understanding FirmwareUpdates: The Whats, Whys,and Hows by Savjani (Year: 2019).\*
Introduction to NVMe Technology by Osr (Year: 2019).\*
Structured Computer Organization by Tanenbaum 1984 (Year: 1984).\*

\* cited by examiner

SYSTEM AND METHOD FOR EXCHANGING MESSAGES

BACKGROUND OF THE INVENTION

1. Field of the Invention

The present disclosure relates to a system and method for exchanging messages, especially to a system and method for exchanging messages of submission queue entries and/or completion queue entries.

2. Description of Related Art

FIG. 1 shows a general system on a chip (SoC) 100 including at least one CPU 110. The operating firmware (hereafter referred to as firmware) of the CPU 110 is used for managing and coordinating the functions of hardware 130 through a system bus 120 so as to perform computation and data processing. Accordingly, the whole function of the SoC 100 is fulfilled.

When firmware interacts with a function of hardware, the hardware needs input information from the firmware in order to finish a task, and this input information is referred to as a command (cmd). After the hardware finishes a task, it feedbacks output information to the firmware, and this output information is referred to as a completion (cmpl). FIG. 2 shows an interaction mode between cmds and cmpls based on a Non-Volatile Memory Express (NVMe) protocol, wherein a system memory 212 of a host 210 stores a submission queue (SQ) of cmds and a completion queue (CQ) of cmpls. The above-mentioned interaction mode adopts a consumer/producer model. In detail, from a standpoint of the SQ, the host 210 is a producer while a slave device 220 is a consumer; the host 210 updates a tail doorbell of the SQ to inform the slave device 220 of how many cmds have been written by the host 210; and the slave device 220 updates a head doorbell of the SQ to inform the host 210 of how many cmds have been retrieved by the slave device 220. In addition, from a standpoint of the CQ, the slave device 220 is a producer while the host 210 is a consumer; the slave device 220 updates a tail doorbell of the CQ to inform the host 210 of how many cmpls have been written by the slave device 220; and the host 210 updates a head doorbell of the CQ to inform the slave device of how many cmpls have been processed by the host 210. A memory 222 in the slave device 220 is used for storing SQ information such as the aforementioned tail doorbell of the SQ and head doorbell of the SQ, and for storing CQ information such as the aforementioned tail doorbell of the CQ and head doorbell of the CQ.

Through the aforementioned handshake based on the doorbells of the SQ/CQ under the NVMe protocol, the interaction between cmds and cmpls of a host (or a slave device) can be realized. FIG. 3 shows communication between cmds and cmpls in a slave device. As shown in FIG. 3, in the slave device 220, the firmware of a CPU 310 visits the resources of the memory 222 through a bus 320; the firmware writes cmds into storage locations addressed by a cmd queue in an incremental order through the bus 320, and then uses register files in a register 330 to provide a pointer directed to the address of a next cmd (cmd_write_pointer) for hardwire 340; the hardware 340 ascertains which cmds are waiting to be processed according to the pointer, and retrieves theses cmds from the cmd queue through the bus 320 to process them; after the hardware 340 finished processing the cmds, it generates cmpls and writes these cmpls into storage locations addressed by a cmpl queue in an incremental order through the bus 320, and then provides a pointer directed to the address of a next cmpl (cmpl_write_pointer) for the firmware; afterward, the firmware obtains the latest cmpl_write_pointer from the register files in the register 330, and thereby retrieves to-be-processed cmpls from the cmpl queue.

In light of the above, the memory 222 of the slave device 220 stores a cmd queue and a cmpl queue. According to the NVMe protocol, the host 210 considers that the slave device 220 fully supports all entries in the SQ and CQ of the host 210; in other words, the cmd queue and the cmpl queue of the slave device 220 are supposed to be corresponding to the SQ and the CQ of the host 210 straightforwardly, and the memory in the slave device 220 for storing the cmd queue and cmpl queue should be corresponding to the memory in the host 210 for storing the SQ and CQ. However, the host 210 usually has much more hardware resources than the slave device 220, and thus the slave device 220 needs to consume a lot of its hardware resources to fully support all entries in the SQ and CQ of the host 210.

SUMMARY OF THE INVENTION

An object of the present disclosure is to provide a system and method for exchanging messages. The system and method are improvements over the prior art.

An embodiment of the system of the present disclosure includes a host and a slave device. The host prepares X submission queue (SQ) entries, wherein the X is an integer greater than one but not greater than a host SQ entry upper limit; the host transmits a SQ tail doorbell to the slave device. The slave device performs multiple read operations according to the SQ tail doorbell and thereby reads the X SQ entries from the host, wherein in each of the multiple read operations, the slave device reads Y SQ entry/entries from the host at most, the Y is a positive integer smaller than the X and not greater than a slave device SQ entry upper limit, and the slave device SQ entry upper limit is smaller than the host SQ entry upper limit; the slave device prepares P completion queue (CQ) entries, wherein the P is an integer greater than one; the slave device performs multiple write operations and thereby transmits the P CQ entries to the host, wherein in each of the multiple write operations, the slave device transmits Q CQ entry/entries to the host at most, and the Q is a positive integer smaller than the P and not greater than a slave device CQ entry upper limit; and the slave device transmits a CQ tail doorbell to the host and thereby informs the host of the slave device finishing writing the P CQ entries.

An embodiment of the method of the present disclosure is performed by a slave device. This embodiment includes steps (1)~(5) as follows: (1) receiving a submission queue (SQ) tail doorbell from a host to learn that X SQ entries in the host need to be processed, wherein the X is an integer greater than one and not greater than a host SQ entry upper limit; (2) performing multiple read operations according to the SQ tail doorbell to read the X SQ entries from the host, wherein the slave device reads Y SQ entry/entries from the host at most in each of the multiple read operations, the Y is a positive integer smaller than the X and not greater than a slave device SQ entry upper limit, and the slave device SQ entry upper limit is smaller than the host SQ entry upper limit; (3) preparing P completion queue (CQ) entries, wherein the P is an integer greater than one; (4) performing multiple write operations to transmit the P CQ entries to the host, wherein the slave device transmits Q CQ entry/entries to the host at most in each of the multiple write operations, and the Q is a positive integer smaller than the P and not greater than a slave device CQ entry upper limit; and (5) transmitting a CQ tail doorbell to the host to inform the host of the slave device finishing writing the P CQ entries.

Another embodiment of the method of the present disclosure is performed by a slave device, and includes the aforementioned steps (1)~(2) for exchanging messages of SQ entries. This embodiment can replace the aforementioned steps (3)~(5) with a known/self-developed method for exchanging messages of CQ entries.

Another embodiment of the method of the present disclosure is performed by a slave device, and includes the aforementioned steps (3)~(5) for exchanging messages of CQ entries. This embodiment can replace the aforementioned steps (1)~(2) with a known/self-developed method for exchanging messages of SQ entries.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a system and method for exchanging messages. The system and method can reduce the consumption of hardware resources of a slave device and prevent a host from being aware of the slave device's saving in hardware resources.

Figure 1:
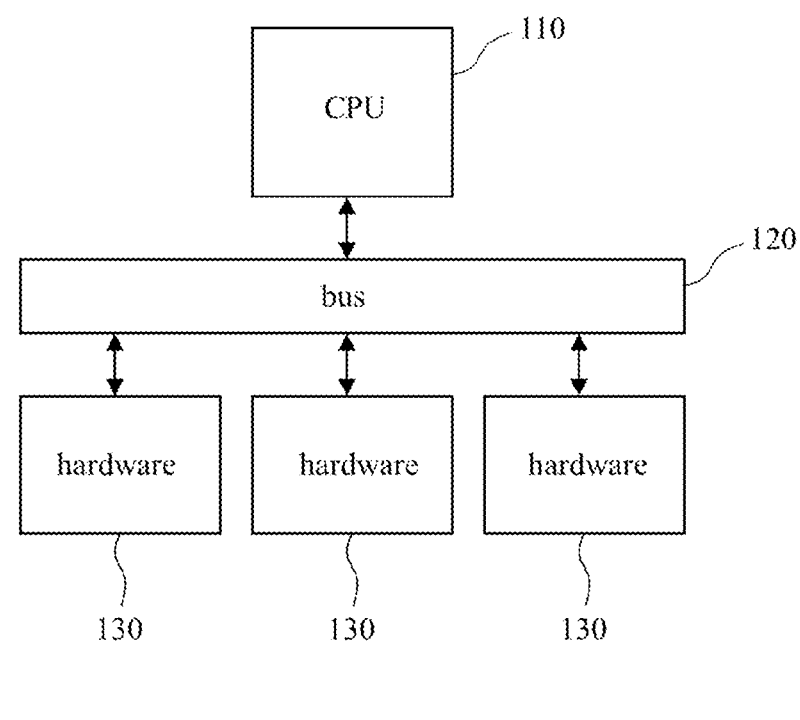
FIG. 1 shows the configuration of a general SoC.
Figure 2:
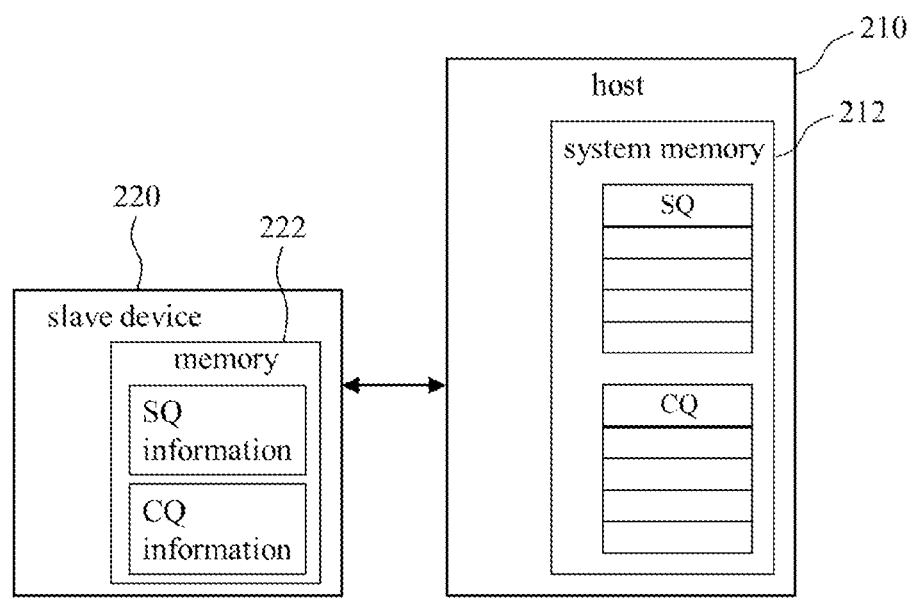
FIG. 2 shows an interaction mode between commands and completions based on an NVMe protocol.
Figure 3:
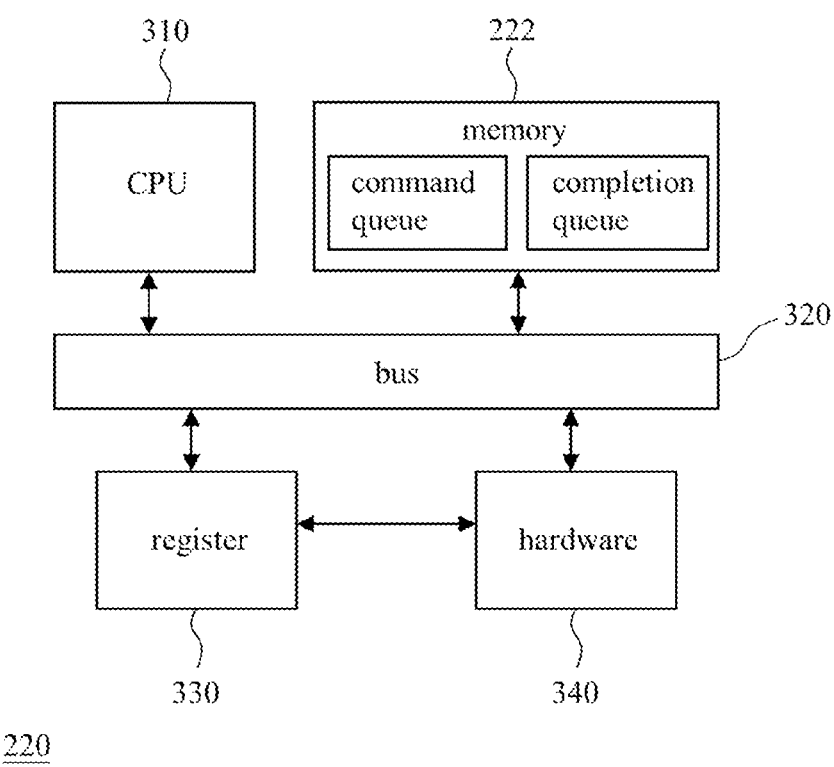
FIG. 3 shows communication between commands and completions in a slave device.
Figure 4:
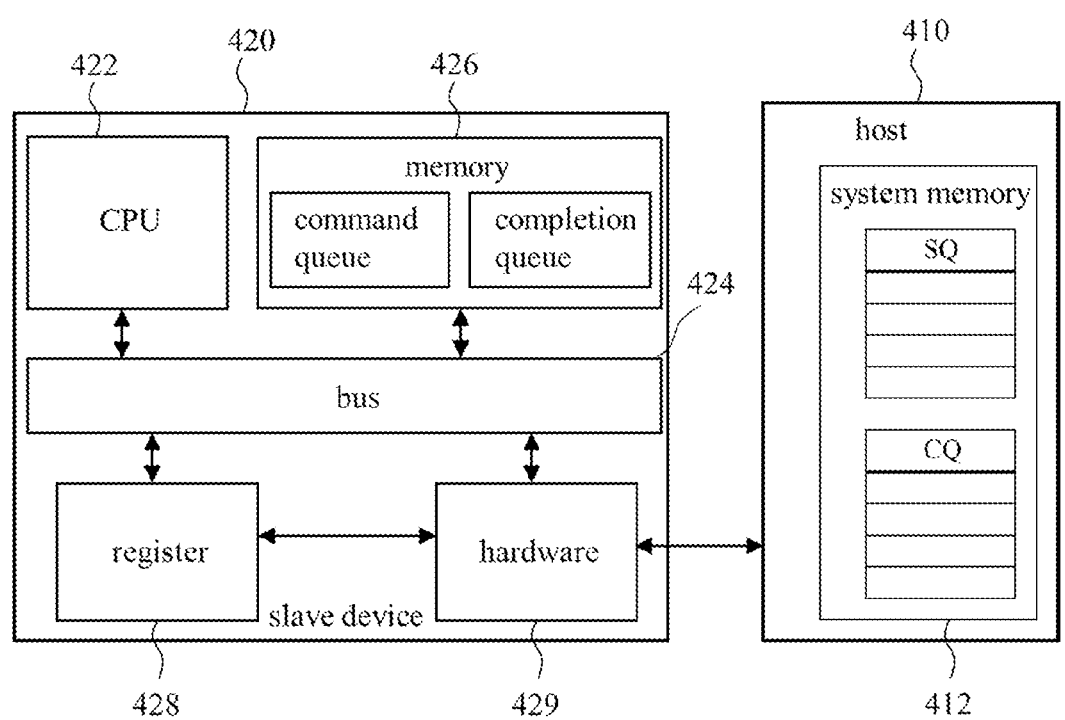
FIG. 4 shows an embodiment of the system of the present disclosure for exchanging messages.

FIG. 4 shows an embodiment of the system of the present disclosure for exchanging messages. The system 400 of FIG. 4 includes a host 410 and a slave device 420. The host 410 and the slave device 420 determine their respective roles according to a transmission protocol (e.g., a Non-Volatile Memory Express (NVMe) protocol), and exchange messages according to the transmission protocol. The host includes a system memory 412. The slave device 420 includes a CPU 422, a bus 424, a memory 426, a register 428, and hardware 429. Each circuit in the host 410 and the slave device 420 alone can be a known/self-developed circuit. In a single message exchange operation (e.g., a single read/write operation), the internal operation of the host 410 and the internal operation of the slave device 420 (e.g., the communication between the firmware of CPU 422 and the hardware 429) can be realized with a known/self-developed technology (e.g., the related art mentioned in the present specification).

Figure 5A:
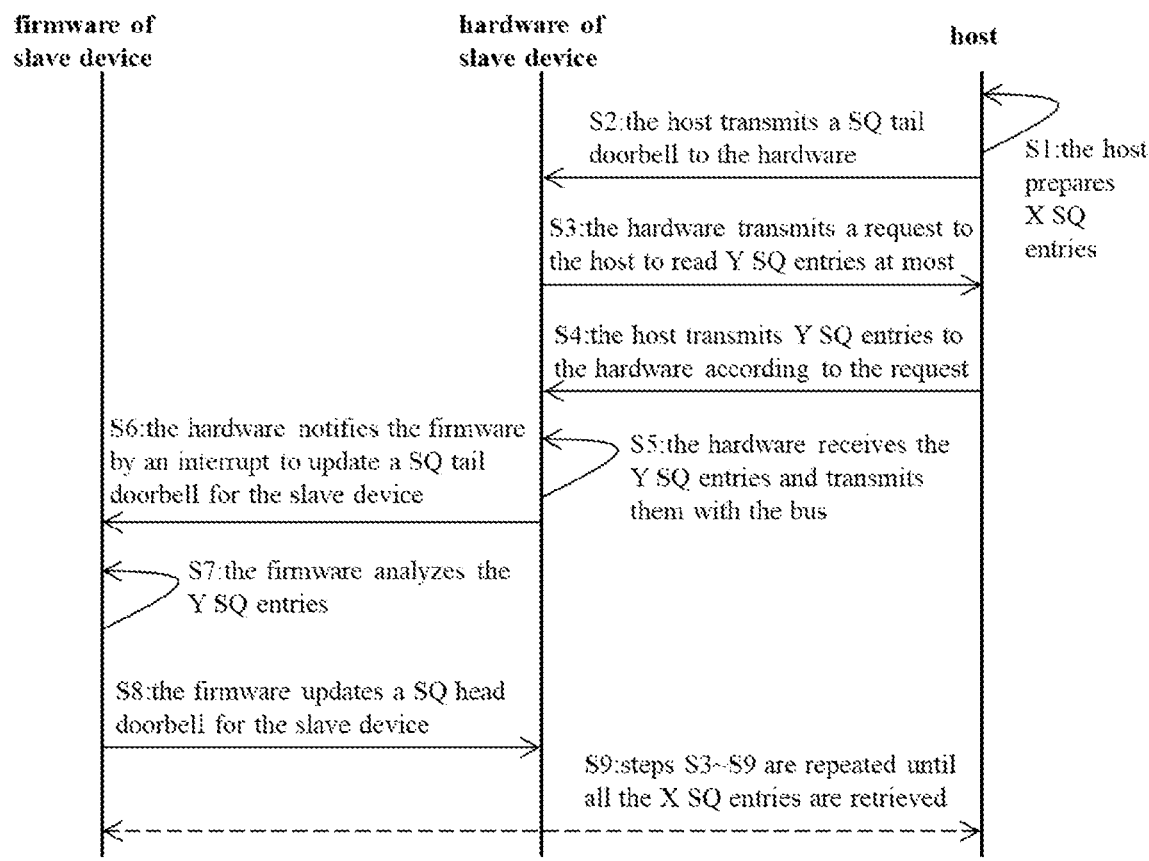
FIG. 5a shows an embodiment of a host and a slave device exchanging messages of submission queue (SQ) entries.
Figure 5B:
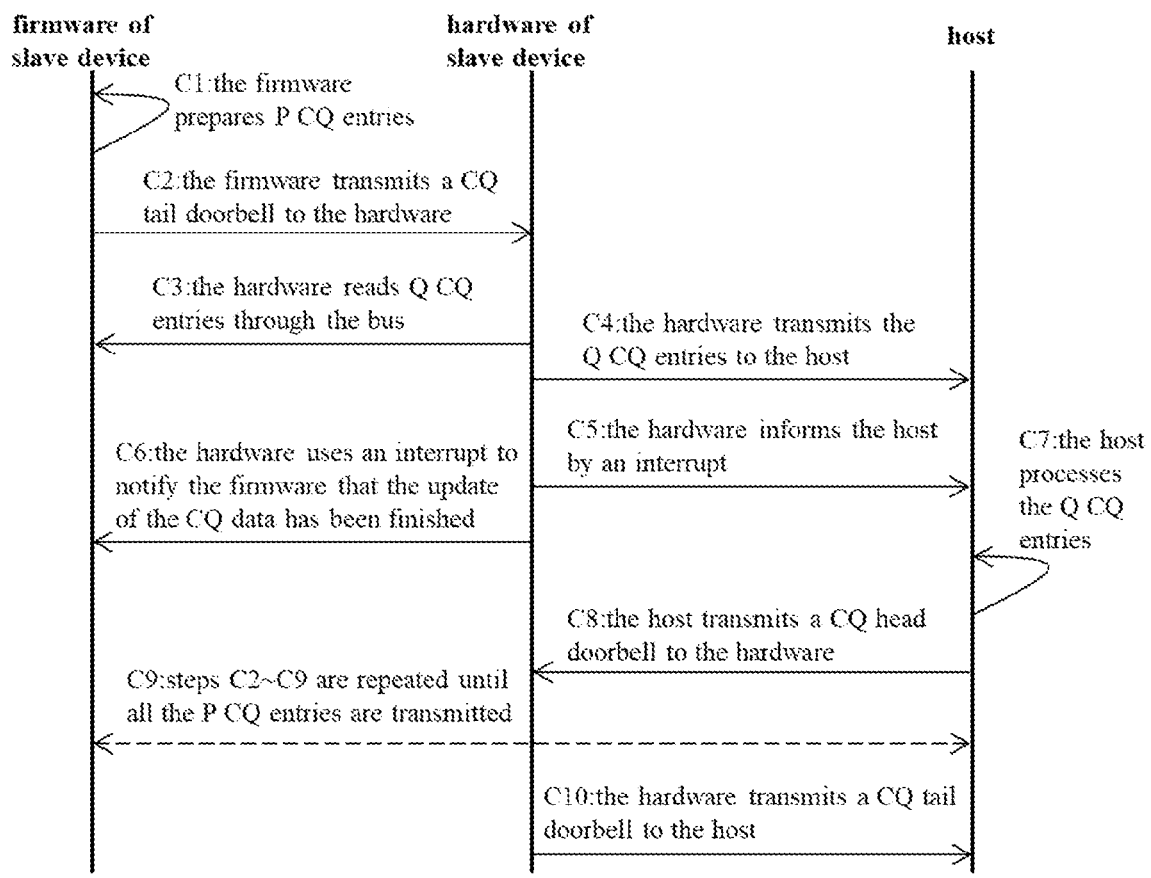
FIG. 5b shows an embodiment of a host and a slave device exchanging messages of completion queue (CQ) entries.

Please refer to FIG. 4. In order to execute an operation (e.g., a read/write operation), the host 410 and the slave device 420 should exchange messages. FIGS. 5a~5b illustrate an embodiment of the host 410 and the slave device 420 exchanging messages, wherein:

step S1: The host 410 prepares X submission queue (SQ) entries, and the X is an integer greater than one but not greater than a host SQ entry upper limit (i.e., the maximum SQ entries that the host 410 can process in a single read operation).

step S2: The host 410 transmits a SQ tail doorbell to the hardware 429 of the slave device 420.

steps S3~S9: The slave device 420 performs multiple read operations according to the SQ tail doorbell and thereby reads the X SQ entries from the host 410. In detail, in each of the multiple read operations, the hardware 429 of the slave device 420 transmits a request to the host 410 in order to "read Y SQ entry/entries" or "read remaining SQ entry/entries (when the number of the remaining SQ entry/entries is smaller than the Y)" (step S3), wherein the Y is a positive integer not greater than a slave device SQ entry upper limit (i.e., the maximum SQ entries that the slave device 420 can process in a single read operation) and the slave device SQ entry upper limit is smaller than the host SQ entry upper limit. When the X is not greater than the slave device SQ entry upper limit, the Y can be equal to the X; and when the X is greater than the slave device SQ entry upper limit, the Y is a positive integer smaller than the X. In order to show the merit of the present embodiment, the X is greater than the slave device SQ entry upper limit in the following discussion. After the step S3, the host 410 transmits Y SQ entry/entries (or remaining SQ entry/entries) to the hardware 429 of the slave device 420 according to the request (step S4); the hardware 429 of the slave device 410 receives the Y SQ entry/entries (or the remaining SQ entry/entries) and transmits it/them through the bus 424 (step S5); the hardware 429 notifies the firmware of the CPU 422 by an interrupt to update a SQ tail doorbell for the slave device 420 (step S6); the firmware analyzes the Y SQ entry/entries (or the remaining SQ entry/entries) (step S7); then the firmware updates a SQ head doorbell for the slave device 420 (step S8); and then the steps S3~S9 are repeated until all the X SQ entries are retrieved (step S9). For example, providing the slave device SQ entry upper limit is $Y_{MAX}$, the Y is equal to $Y_{MAX}$, and $X = K_1 \times Y_{MAX} + Z_1$, the steps S3~S9 will be executed $(K_1+1)$ times to retrieve $K_1$ set(s) of SQ entries and $Z_1$ SQ entry/entries, wherein each set of SQ entries includes $Y_{MAX}$ SQ entries, and the $Z_1$ is a number of the aforementioned remaining SQ entry/entries and is smaller than $Y_{MAX}$.

step C1: The firmware of the slave device 420 prepares P completion queue (CQ) entries, wherein the P is an integer greater than one. For example, the P is equal to the X mentioned in the step S1. It should be noted that before the firmware of the slave device 420 finishes preparing all the P CQ entries, the execution of the steps (e.g., the steps C2~C8 described below) subsequent to the step C1 can begin. In an exemplary implementation, the P CQ entries include a SQ head doorbell message that is used for informing the host 410 of the slave device 420 finishing reading the X SQ entries.

Steps C2~C9: The slave device 420 performs multiple write operations and thereby transmits the P CQ entries to the host 410. In detail, in each of the multiple write operations, the firmware of the CPU 422 of the slave device 420 transmits a CQ tail doorbell to the hardware 429 of the slave device 420 first (step C2); and then the hardware 429 reads "Q CQ entry/entries" or "remaining CQ entry/entries (when the number of the remaining CQ entry/entries is smaller than the Q)" through the bus 424 (step C3), wherein the Q is not greater than a slave device CQ entry upper limit (i.e., the maximum CQ entries that the slave device 420 can process in a single write operation) and the slave device CQ entry upper limit is smaller than a host CQ entry upper limit (i.e., the maximum CQ entries that the host 410 can process in a single write operation). When the P is not greater than the slave device CQ entry upper limit, the Q can be equal to the P; and when the P is greater than the slave device CQ entry upper limit, the Q is a positive integer smaller than the P. In order to show the merit of the present embodiment, the P is greater than the slave device CQ entry upper limit in the following discussion. After the step C3, the hardware 429 transmits the Q CQ entry/entries (or the remaining CQ entry/entries) to the host 410 (step C4); the hardware 429 informs the host 410 by an interrupt (step C5); the hardware 429 uses an interrupt to notify the firmware of the CPU 422 that the update of the CQ data has been finished (step C6); the host 410 processes the Q CQ entry/entries (or the remaining CQ entry/entries) (step C7); then the host 410 transmits a CQ head doorbell to the hardware 429 of the slave device 420 (step C8); and then the steps C2~C9 are repeated until all the P CQ entries are transmitted to the host 410 (step C9). For example, providing the slave device CQ entry upper limit is $Q_{MAX}$, the Q is equal to $Q_{MAX}$, and $P = K_2 \times Q_{MAX} + Z_2$, the steps C2~C9 will be executed ($K_2+1$) times to retrieve $K_2$ set(s) of CQ entries and $Z_2$ CQ entry/entries, wherein each set of CQ entries includes $Q_{MAX}$ CQ entries, and the $Z_2$ is a number of the aforementioned remaining CQ entry/entries and is smaller than $Q_{MAX}$.

step C10: The hardware 429 of the slave device 420 transmits a CQ tail doorbell to the host 410 and thereby informs the host 410 of the slave device 420 finishing writing the P CQ entries.

Please refer to FIGS. 4~5b. In a single read operation, the maximum SQ entries that the slave device 420 can read (i.e., the slave device SQ entry upper limit) is fewer than the maximum SQ entries that the host 410 can prepare (i.e., the host SQ entry upper limit). Accordingly, although the host 410 anticipates that the slave device 420 can fully support the host SQ entry upper limit in a single read operation according to the aforementioned transmission protocol, the maximum SQ entries that the slave device 420 can support in the single read operation in practice is below the host's anticipation, and thus the slave device 420 needs to perform multiple read operations to read all the SQ entries in comparison with the prior art. However, the command (cmd) queue stored in the slave device 420 for a single read operation doesn't need to be fully corresponding to the submission queue (SQ) stored in the host 410, therefore the memory size of the slave device 420 for storing the cmd queue can be smaller than the memory size of the host 410 for storing the submission queue, and the slave device 420 doesn't need to spend a lot of hardware resources for storing the cmd queue.

Please refer to FIGS. 4~5b. In a single write operation, the maximum CQ entries that the slave device 420 can transmit (i.e., the slave device CQ entry upper limit) is fewer than the maximum CQ entries that the host 410 can process (i.e., the host SQ entry upper limit "CQ $\#_{MAX}$"). Accordingly, although the host 410 anticipates that the slave device 420 can provide CQ $\#_{MAX}$ CQ entries at most in the single write operation according to the aforementioned transmission protocol, the maximum CQ entries that the slave device 420 can provide in the single read operation in practice is below the host's anticipation, and thus the slave device 420 needs to perform multiple write operations to provide all the CQ entries to the host 410 in comparison with the prior art. However, the completion (cmpl) queue stored in the slave device 420 for a single write operation doesn't need to be fully corresponding to the host CQ entry upper limit, therefore the memory size of the slave device 420 for storing the cmpl queue can be smaller than the memory size of the host 410 for storing the completion queue (CQ), and the slave device 420 doesn't need to spend a lot of hardware resources for storing the cmpl queue.

An alternative embodiment of the system of the present disclosure includes the features illustrated with FIG. 4 and FIG. 5a without FIG. 5b; this embodiment is for exchanging messages of SQ entries, and can cooperate with a known/self-developed technology to exchange messages of CQ entries. Another alternative embodiment of the system of the present disclosure includes the features illustrated with FIG. 4 and FIG. 5b without FIG. 5a. This embodiment is for exchanging messages of CQ entries, and can cooperate with a known/self-developed technology to exchange messages of SQ entries.

Figure 6:
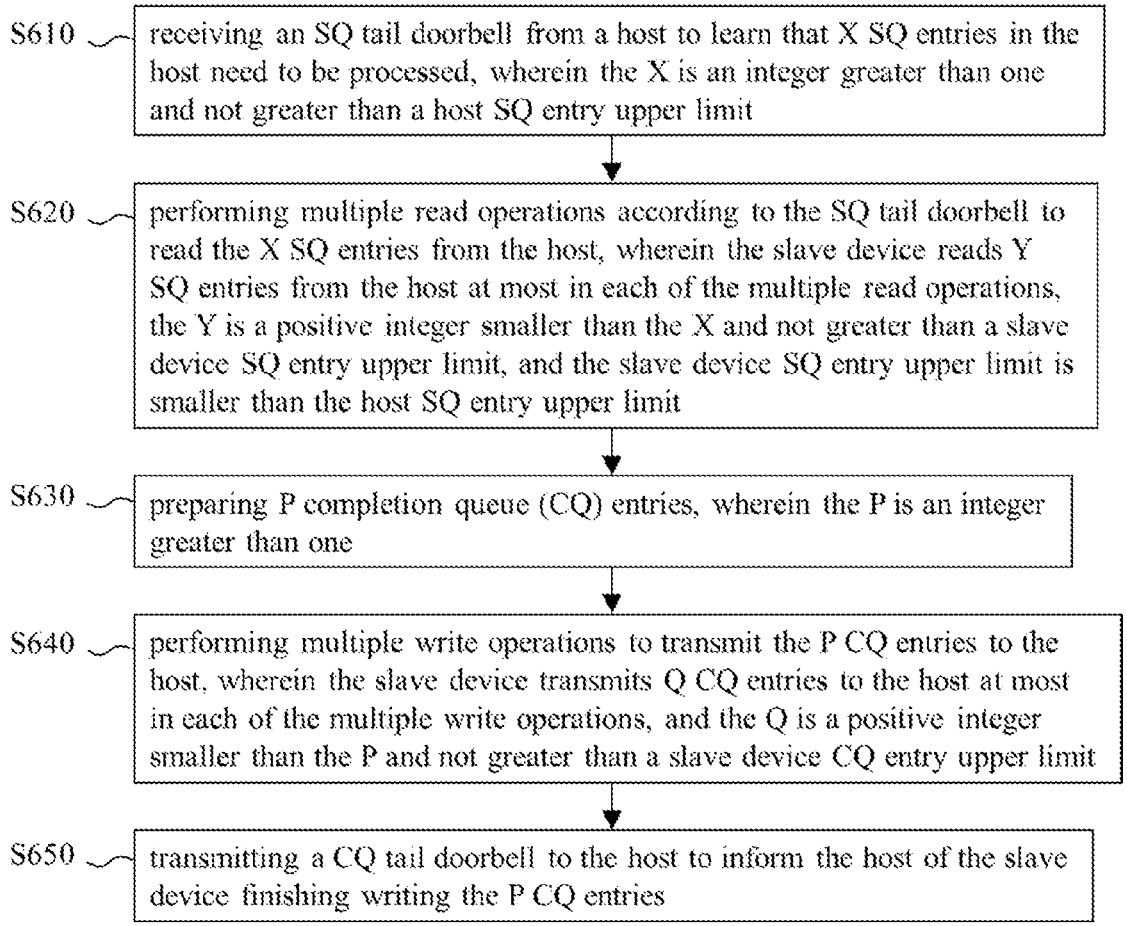
FIG. 6 shows an embodiment of the method of the present disclosure for exchanging messages of SQ and CQ entries.

FIG. 6 shows an embodiment of the method of the present disclosure. The embodiment of FIG. 6 is performed by a slave device for reading SQ entries from a host and providing CQ entries to the host. This embodiment includes the following steps:

S610: receiving a submission queue (SQ) tail doorbell from a host to learn that X SQ entries in the host need to be processed, wherein the X is an integer greater than one and not greater than a host SQ entry upper limit.

S620: performing multiple read operations according to the SQ tail doorbell to read the X SQ entries from the host, wherein the slave device reads Y SQ entry/entries (e.g., the aforementioned $Y_{MAX}$ entry/entries or $Z_1$ SQ entry/entries) from the host at most in each of the multiple read operations, the Y is a positive integer smaller than the X and not greater than a slave device SQ entry upper limit, and the slave device SQ entry upper limit is smaller than the host SQ entry upper limit.

S630: preparing P completion queue (CQ) entries, wherein the P is an integer greater than one.

S640: performing multiple write operations to transmit the P CQ entries to the host, wherein the slave device transmits Q CQ entry/entries (e.g., the aforementioned $Q_{MAX}$ entry/entries or $Z_2$ CQ entry/entries) to the host at most in each of the multiple write operations, and the Q is a positive integer smaller than the P and not greater than a slave device CQ entry upper limit.

S650: transmitting a CQ tail doorbell to the host to inform the host of the slave device finishing writing the P CQ entries.

Figure 7:
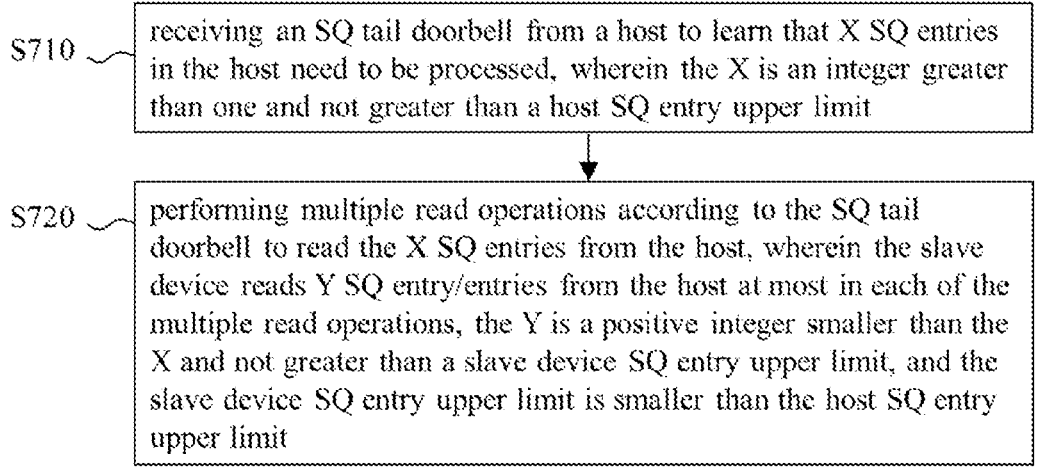
FIG. 7 shows another embodiment of the method of the present disclosure for exchanging messages of SQ entries.

FIG. 7 shows another embodiment of the method of the present disclosure. The embodiment of FIG. 7 is performed by a slave device for reading SQ entries from a host. This embodiment includes the following steps:

S710: receiving a submission queue (SQ) tail doorbell from a host to learn that X SQ entries in the host need to be processed, wherein the X is an integer greater than one and not greater than a host SQ entry upper limit.

S720: performing multiple read operations according to the SQ tail doorbell to read the X SQ entries from the host, wherein the slave device reads Y SQ entry/entries from the host at most in each of the multiple read operations, the Y is a positive integer smaller than the X and not greater than a slave device SQ entry upper limit, and the slave device SQ entry upper limit is smaller than the host SQ entry upper limit.

Figure 8:
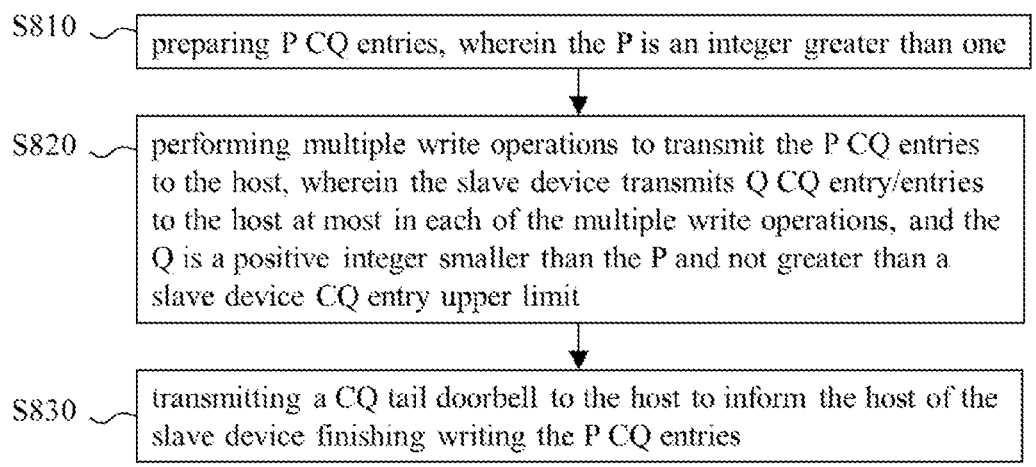
FIG. 8 shows yet another embodiment of the method of the present disclosure for exchanging messages of CQ entries.

FIG. 8 shows another embodiment of the method of the present disclosure. The embodiment of FIG. 8 is performed by a slave device for providing CQ entries to a host. This embodiment includes the following steps:

S810: preparing P completion queue (CQ) entries, wherein the P is an integer greater than one. In this embodiment, the P is greater than a slave device CQ entry upper limit.

S820: performing multiple write operations to transmit the P CQ entries to the host, wherein the slave device transmits Q CQ entry/entries to the host at most in each of the multiple write operations, and the Q is a positive integer smaller than the P and not greater than a slave device CQ entry upper limit.

S650: transmitting a CQ tail doorbell to the host to inform the host of the slave device finishing writing the P CQ entries.

Since those having ordinary skill in the art can appreciate the detail and modification of the embodiments of FIGS. 6~8 by referring to the description of the embodiments of FIGS. 4~5b, which implies that some or all of the features of the embodiments of FIGS. 4~5b can be applied to the embodiments of FIGS. 6~8 in a logical way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the system and method of the present disclosure can reduce the consumption of hardware resources of a slave device and prevent the operation of a host from being affected.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A system for exchanging messages, comprising:
a host, comprising a system memory having:
a first host memory section, having a first host memory size, storing a submission queue (SQ) of commands; and
a second host memory section, having a second host memory size, storing a completion queue (CQ) of completions; and
a slave device directly coupled to the host to exchange bidirectional messages with the host, the slave device including:
a bus;
a CPU coupled to the bus, the CPU executing a firmware of the slave device;
a device memory coupled to the bus, the device memory having:
a first slave memory section, having a first slave memory size, storing a queue of sequential commands; and
a second slave memory section, having a second slave memory size, storing a queue of completion entries; and
a register coupled to the bus;
wherein the first slave memory size is smaller than the first host memory size and the second slave memory size is smaller than the second host memory size;
wherein the host prepares and stores X SQ entries in the first host memory section and transmits a SQ tail doorbell to the slave device;
wherein in response to receiving the SQ tail doorbell from the host, the slave device repeats the following steps until all of the X SQ entries are received and processed:
the slave device transmits a request to the host to read an incomplete subgroup Y SQ entries of the X SQ entries, the host transmits the Y SQ entries to the slave device in accordance with the request, the slave device receives the Y SQ entries from the host, executes an interrupt of the firmware to analyze and perform the Y SQ entries, and updates a SQ head doorbell accordingly after completion of the Y SQ entries.

2. The system for exchanging messages of claim 1, wherein the firmware of the slave device prepares P CQ completion entries; and
wherein the slave device repeats the following steps until all the P CQ completion entries are transmitted:
the firmware generates a CQ tail doorbell accordingly, the slave device reads an incomplete subgroup Q CQ entries of the P CQ entries and transmits the Q CQ entries to the host, executes an interrupt to inform the host of the Q CQ entries transmission, executes an interrupt of the firmware to notify the firmware that the update of the Q CQ entries has been finished, and receives an CQ head doorbell from the host; and
wherein the slave device transmits a corresponding CQ tail doorbell to the host after finishing writing the P CQ entries.

* * * * *